United States Patent
Perrin et al.

(10) Patent No.: US 11,869,364 B2
(45) Date of Patent: Jan. 9, 2024

(54) ENHANCED FLIGHT VISION SYSTEM FOR AIRCRAFT

(71) Applicant: Airbus Operations SAS, Toulouse (FR)

(72) Inventors: Aymeric Perrin, Toulouse (FR); Jerome Gouillou, Toulouse (FR); Francis Blondel, Toulouse (FR); Fabrice Bousquet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 258 days.

(21) Appl. No.: 17/333,544

(22) Filed: May 28, 2021

(65) Prior Publication Data

US 2021/0383705 A1 Dec. 9, 2021

(30) Foreign Application Priority Data

Jun. 4, 2020 (FR) ..................................... 2005841

(51) Int. Cl.
*G02B 27/00* (2006.01)
*G08G 5/00* (2006.01)
(Continued)

(52) U.S. Cl.
CPC .......... *G08G 5/0021* (2013.01); *B64D 47/08* (2013.01); *G02B 27/0101* (2013.01);
(Continued)

(58) Field of Classification Search
CPC .... G08G 5/0021; G08G 5/025; G08G 5/0086; B64D 47/08; B64D 43/00; B64D 45/08;
(Continued)

(56) References Cited

U.S. PATENT DOCUMENTS

| | | | |
|---|---|---|---|
| 8,711,220 B2 * | 4/2014 | Tiana | H04N 7/18 348/148 |
| 8,803,727 B2 * | 8/2014 | Muensterer | G01S 17/93 342/63 |

(Continued)

FOREIGN PATENT DOCUMENTS

EP 3637058 A1 4/2020

OTHER PUBLICATIONS

French Search Report; priority document.

*Primary Examiner* — Frank F Huang
(74) *Attorney, Agent, or Firm* — Greer, Burns & Crain, Ltd.

(57) ABSTRACT

The enhanced flight vision system of an aircraft comprises an image acquisition system provided to acquire images of an outside environment of the aircraft, and a display system configured to allow information to be displayed on a display unit overlayed with the outside environment of the aircraft. The display system is configured to receive images produced by the image acquisition system and to display these images on the display unit. The image acquisition system is configured to associate ancillary information with at least a part of the images produced and the display system is configured to check the integrity of an image received from the image acquisition system, based on the ancillary information associated with that image; and in the absence of integrity, deactivate the display on the display unit of at least the image received from the image acquisition system.

10 Claims, 3 Drawing Sheets

(51) Int. Cl.
  *B64D 47/08* (2006.01)
  *G02B 27/01* (2006.01)
  *G08G 5/02* (2006.01)

(52) U.S. Cl.
  CPC ....... *G08G 5/025* (2013.01); *G02B 2027/014* (2013.01); *G02B 2027/0138* (2013.01)

(58) Field of Classification Search
  CPC ........ G02B 27/0101; G02B 2027/0138; G02B 2027/014; G06V 10/62; G06V 20/56; G01S 7/04; G01S 13/89; G01C 21/20; G01C 23/00; G06T 19/006
  See application file for complete search history.

(56) References Cited

U.S. PATENT DOCUMENTS

| | | | |
|---|---|---|---|
| 9,390,559 B2 * | 7/2016 | Feyereisen | B64D 45/00 |
| 10,001,376 B1 * | 6/2018 | Tiana | G01C 23/005 |
| 10,298,840 B2 * | 5/2019 | Guenter | H04N 23/667 |
| 10,354,140 B2 * | 7/2019 | Guenter | G06F 18/22 |
| 10,504,397 B2 * | 12/2019 | Guenter | G09G 3/006 |
| 10,920,749 B2 * | 2/2021 | Grunnet | G06T 17/00 |
| 11,187,909 B2 * | 11/2021 | Guenter | G02B 27/0179 |
| 2010/0231705 A1 | 9/2010 | Yahav et al. | |
| 2013/0050485 A1 * | 2/2013 | Tiana | G06T 7/0002 |
| | | | 348/148 |
| 2020/0116521 A1 | 4/2020 | Barber et al. | |

* cited by examiner

ENHANCED FLIGHT VISION SYSTEM FOR AIRCRAFT

CROSS-REFERENCES TO RELATED APPLICATIONS

This application claims the benefit of the French patent application No. 2005841 filed on Jun. 4, 2020, the entire disclosures of which are incorporated herein by way of reference.

FIELD OF THE INVENTION

The invention relates to the field of the display in aircraft cockpits.

BACKGROUND OF THE INVENTION

Some aircraft include an enhanced flight vision system EFVS. Such an EFVS system generally comprises a display system in the cockpit of the aircraft, configured to allow information to be displayed on a display unit in such a way that this information is visible to a pilot of the aircraft overlayed with an outside environment of the aircraft. The EFVS system also comprises an image acquisition system, comprising at least one image sensor and provided to acquire images of the outside environment of the aircraft. The display system is configured to receive images produced by the image acquisition system and to display these images on the display unit. The display unit is, for example, a head-up display, generally referred to by its acronym HUD, or a display unit provided to be worn attached to the head of a user, generally called HMD (Head Mounted Display). Preferably, the image sensor is provided to capture images in a range of wavelengths including wavelengths invisible to the human eye, for example wavelengths of infrared or radar type. With these images being displayed on the display unit overlayed with the outside environment of the aircraft, the EFVS system thus allows a crew member using the system (for example, a pilot) to have an enhanced vision of the outside environment. This is particularly useful at night or in cases of fog. The EFVS system, for example, allows the pilot to better view a landing runway despite the night or the fog, during a landing runway approach phase.

Initially, the EFVS system was used by pilots as an aid allowing them to improve their perception of the outside environment of the aircraft, but the regulations in force did not allow it to be used as the sole visual source for performing an approach to a landing runway, or a landing on this landing runway. Thus, apart from the case of a so-called "all weather" landing, the pilot of an aircraft performing an approach to a landing runway must see the landing runway (without the aid of the EFVS system) when he or she, when descending, arrives at a predetermined altitude, called decision altitude. If he or she does not see the landing runway, the pilot must perform a go-around. For some time now it has been possible to use the EFVS system to allow a pilot to take the decision to continue an approach to a landing runway when he or she arrives at the decision altitude, then to guide the aircraft to the landing runway and perform the landing, on the basis solely of the images displayed by the EFVS system. The pilot can thus continue an approach to the landing runway despite poor visibility conditions, for example in cases of fog. That thus allows the aircraft to land on a landing runway despite poor visibility conditions, even if the aircraft is not equipped with a system designed to allow an all-weather landing Minimum visibility conditions are, however, still demanded in the context of these operations, notably to limit impacts in the event of a vision system error.

For the images produced by the EFVS system to be able to be used by a pilot to take the decision to land on a landing runway, then to guide the aircraft in a non-automatic manner to the landing runway with no restriction concerning the outside visibility conditions, it would be necessary for the probability of failure of the EFVS system to be low enough not to risk creating a situation considered to be catastrophic. For that, the aircraft certification authorities demand this probability to be lower than or equal to $1 \times 10^{-9}$. For that, it would be necessary for the quality assurance level of the EFVS system to be of DAL A type (DAL standing for "Design Assurance Level") according to the classification defined in the Eurocae document ED-79A/SAE ARP 4754A. The quality assurance level of the display system in the cockpit is generally indeed of DAL-A type. However, the quality assurance level of the image acquisition system is not of DAL-A type, but rather of DAL-B type, even DAL-C. The result thereof is that the quality assurance level of the EFVS system comprising the display system in the cockpit and the image acquisition system is not of DAL-A type. Now, it would be very costly to develop an image acquisition system of DAL-A type.

The inventors have analyzed the potential risks in the event of failure of the image acquisition system of the EFVS system. The main risk, in an approach to a landing runway, is a risk of offsetting of the images that the image acquisition system supplies display system of the EFVS system. This risk of offset relates equally to a spatial offset (vertical or lateral) and a temporal offset. Indeed, in the case of a downward offset of the image displayed on the display unit, the pilot is urged to command the aircraft to pitch down in order to be able to land on the landing runway even though this pitch down command is not necessary. Thus, in the case of an excessive downward offset of the image, this could result in a risk of collision of the aircraft with the terrain, in particular when the aircraft is flying at low altitude. An excessive time offset between an instant of acquisition of an image by the image acquisition system and an instant of display of this image on the display unit could, in certain circumstances, culminate in the same result. Indeed, the display on the display unit is then no longer consistent with the current attitude of the aircraft. In particular, when the pilot commands an increase in downward pitch of the aircraft, the effect of the command is displayed with a delay on the display unit, which may prompt the pilot to increase the pitch down command even though that was not necessary. This could result in a risk of collision of the aircraft with the terrain, in particular when the aircraft is flying at low altitude.

SUMMARY OF THE INVENTION

An aim of the present invention is notably to provide a solution to this problem. It relates to an enhanced flight vision system comprising:
- a display system for the cockpit of an aircraft configured to allow information to be displayed on a display unit in such a way that this information is visible to a pilot of the aircraft overlayed with an outside environment of the aircraft; and
- an image acquisition system, comprising at least one image sensor and provided to acquire images of the outside environment of the aircraft, wherein the display system is configured to receive images produced by the image acquisition system and to display these images on the display unit.

The enhanced flight vision system is noteworthy in that the image acquisition system is configured to associate ancillary information with at least some of the images produced, and in that the display system is configured to:

check the integrity of an image received from the image acquisition system, on the basis of the ancillary information associated with that image; and in the absence of integrity, deactivate the display on the display unit of at least the image received from the image acquisition system.

Thus, the enhanced flight vision system checks the integrity of the images produced by the image acquisition system and it displays these images on the display unit only in cases of integrity. In the absence of integrity of an image, the display at least of the image on the display unit is deactivated. That makes it possible to not display images which could prompt the pilot toward inappropriate piloting commands, for example an excessive pitch down command. The fact that the display of the images on the display unit is deactivated in the absence of integrity of the images requires the pilot to use other sources of information to pilot the aircraft or to implement planned procedures in such circumstances. For example, in an approach to a landing runway, the pilot then knows that, in the absence of visibility of the landing runway through the windshield of the aircraft upon reaching an altitude called decision altitude when descending, he or she must perform a go-around. The enhanced flight vision system thus makes it possible to guarantee the safety of the flight of the aircraft even if it is used in an approach to a landing runway.

Advantageously, the display unit is a head-up display or a display unit provided to be worn attached to the head of a user.

According to a first embodiment, the ancillary information corresponds to a time stamp of the image.

Advantageously, the display system is then configured to transmit a clock to the image acquisition system and the image acquisition system is configured to time stamp the images on the basis of the clock.

In particular, the enhanced flight vision system is then such that:

the display system is configured to calculate a control code corresponding to the clock and to transmit the clock, with this associated control code, to the image acquisition system;

the image acquisition system is configured to time stamp the images on the basis of the clock and the associated control code; and the display system is configured to check whether the control code associated with an image received from the image acquisition system is correct, and, if the control code associated with this image is not correct, to reject this image and to determine an absence of integrity of the image.

More advantageously, the enhanced flight vision system according to the first embodiment is such that the display system is configured in such a way that, when it receives an image from the image acquisition system, it calculates a difference between a current clock value and the clock value corresponding to the time stamp of the image and, it determines either an integrity of the image if this difference is less than a predetermined time, or an absence of integrity of the image if this time difference is greater than or equal to the predetermined time.

According to a second embodiment, the ancillary information corresponds to a predefined pattern and the display system is configured to:

when it receives an image from the image acquisition system, search for the predefined pattern in the received image and determine a position of the predefined pattern in the received image;

determine a deviation between the position of the predefined pattern in the received image and a reference position;

determine either an integrity of the received image if this deviation is less than a predetermined value, or an absence of integrity of the received image if this deviation is greater than or equal to the predetermined value.

According to a first alternative, the image acquisition system comprises a mark interposed between the image sensor and the environment, this mark corresponding to the predefined pattern.

According to a second alternative, the image sensor of the image acquisition system comprises a mark corresponding to the predefined pattern.

The invention also relates to an aircraft comprising an enhanced flight vision system as mentioned above.

BRIEF DESCRIPTION OF THE DRAWINGS

The invention will be better understood on reading the following description and on studying the attached figures.

DETAILED DESCRIPTION OF THE PREFERRED EMBODIMENTS

Figure 1:
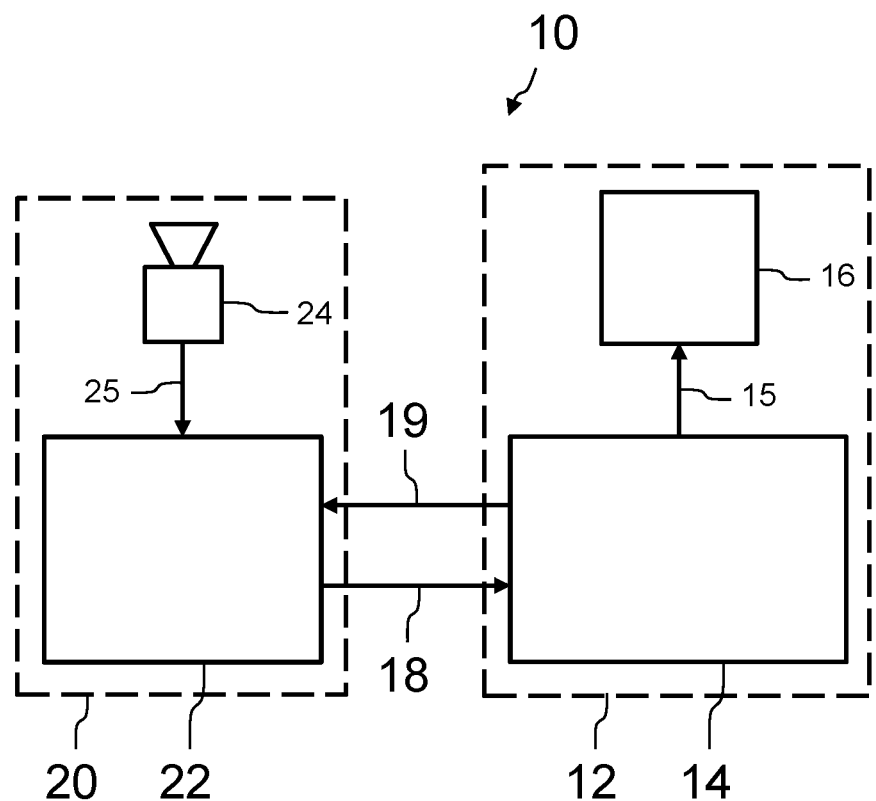
FIG. 1 schematically illustrates an enhanced flight vision system according to the invention.
Figure 5:
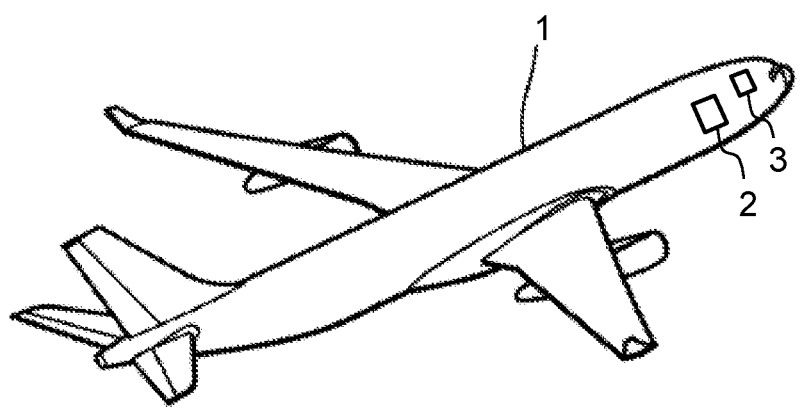
FIG. 5 illustrates an aircraft comprising an enhanced flight vision system.

The enhanced flight vision system 10 represented in FIG. 1 comprises a display system 12 for an aircraft cockpit, an image acquisition system 20, and a communication link 18 from the image acquisition system 20 to the display system 12. The display system 12 comprises a processing unit 14, a display unit 16, and a link 15 from the processing unit 14 to the display unit 16. The image acquisition system 20 comprises a processing unit 22, a source of images 24 comprising an image sensor, and a link 25 from the source of images 24 to the processing unit 22. The source of images 24 corresponds, for example, to an infrared camera. That comprises an image sensor, for example a CMOS sensor or a CCD (Charge Coupled Device) sensor. The enhanced flight vision system 10 is provided to be installed onboard an aircraft such as the aircraft 1 represented in FIG. 5. The display unit 16 is then installed in a cockpit 3 of the aircraft. This display unit corresponds, for example, to a head-up display (HUD) or to a display unit designed to be worn attached to the head of a user such as a pilot of the aircraft. The processing units 14 and 22 are, for example, installed in an avionics bay 2 of the aircraft. The source of images 24 is disposed in such a way as to be able to acquire images of an environment of the aircraft potentially visible to a pilot of the aircraft through a windshield of the cockpit 3.

In operation, the source of images 24 acquires images of the outside environment of the aircraft and it transmits these images to the processing unit 22 of the image acquisition system 20 by the link 25. The processing unit 22 receives these images and transmits them to the processing unit 14 of the display system 12. The processing unit 14 of the display system 12 receives these images produced by the image acquisition system 20 and consequently commands the display on the display unit 16 via the link 15, such that the images displayed on the display unit 16 are visible to a pilot of the aircraft overlayed on and matching with the outside environment of the aircraft (so-called conformal vision).

According to the invention, the image acquisition system 20 associates ancillary information with at least some of the images produced. When it receives an image from the image acquisition system 20, via the link 18, the processing unit 14 of the display system 12 checks the integrity of the received image, based on the ancillary information associated with that image. In the absence of integrity, the processing unit 14 deactivates the display on the display unit 16 of at least the image received from the image acquisition system.

Figure 2:
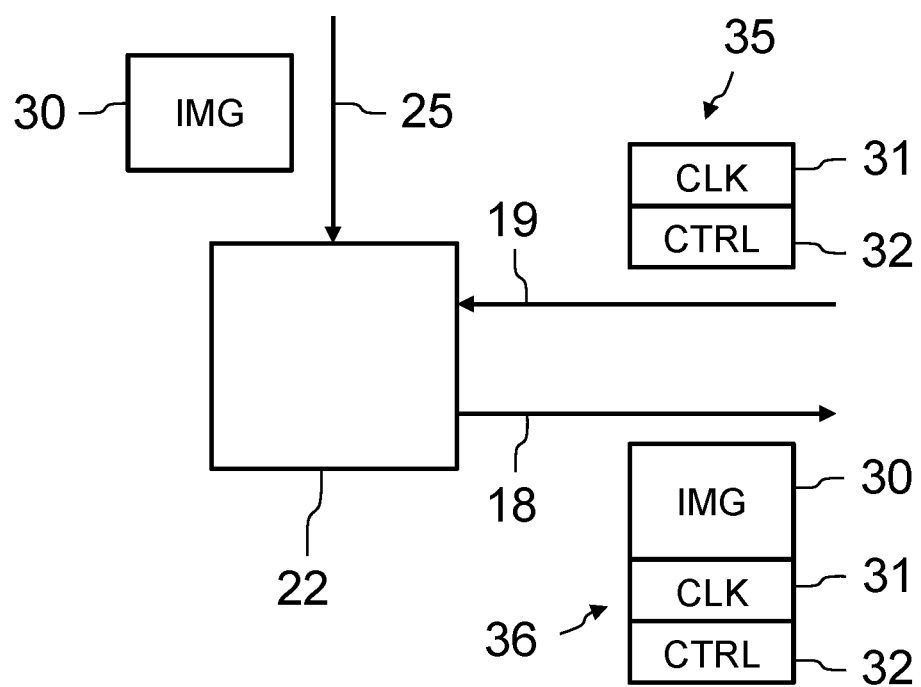
FIG. 2 illustrates a first embodiment of the enhanced flight vision system of FIG. 1.

In a first embodiment, the ancillary information corresponds to a time stamp of the image with which it is associated. As illustrated in FIG. 2, when the processing unit 22 of the image acquisition system 20 receives an image 30 (labelled IMG in FIG. 2) from the source of images 24 by the link 25, it associates a clock value with that image, then it transmits the set 36 comprising the image 30 and the clock value 31 (labelled CLK in the figure) over the link 18, to the processing unit 14 of the display system 12. When the processing unit 14 of the display system 12 receives the set 36 comprising the image 30 and the clock value 31, it calculates a difference between a current clock value available for the processing unit 14 and the received clock value 31, corresponding to the time stamp of the image. The processing unit 14 of the display system 12 determines either an integrity of the image 30 if this difference is less than a predetermined time, or an absence of integrity of the image 30 if this difference is greater than or equal to the predetermined time. In the absence of integrity, the processing unit 14 deactivates the display on the display unit 16 of at least the image 30 received from the image acquisition system 20. The predetermined time is, for example, chosen from an interval of 100 ms to 250 ms. According to a first variant, the processing unit 22 of the image acquisition system 20 associates a clock value 31 with each image 30 that it sends over the link 18 to the processing unit 14 of the display system 12. According to a second variant, the processing unit 22 of the image acquisition system 20 associates a clock value 31 with just some of the images 30 that it sends over the link 18 to the processing unit 14 of the display system 12. For example, it associates a clock value 31 with one image 30 out of N images transmitted, N being an integer number between 2 and 100, preferably between 10 and 25. When the processing unit 14 of the display system determines an absence of integrity of an image received on the basis of the associated clock value 31, then it deactivates the display of the received images, on the display unit 16, at least until a new clock value is received that is associated with an image received subsequently.

Advantageously, the clock used by the processing unit 22 of the image acquisition system 20 to time stamp the images, on the one hand, and the clock used by the processing unit 14 of the display system 12 to make the comparison of the clock value 31 associated with an image 30, on the other hand, are derived from a common clock. This common clock is, for example, a clock internal to the enhanced flight vision system 10 or else a clock received by the enhanced flight vision system originating from other equipment of the aircraft 1. According to an advantageous, although not limiting, alternative of the invention, the enhanced flight vision system 10 further comprises a communication link 19 between the display system 12 and the image acquisition system 20. The display system 12 is then configured to transmit a clock value 31 to the image acquisition system 20 by means of the link 19, as illustrated in FIG. 2. The image acquisition system 20 performs the time stamping of the images on the basis of the clock. That makes it possible to control the clock value transmission latencies in the enhanced flight vision system: thus, in the absence of failure of the system, acceptable time intervals are known for the time of transmission of a clock value over the link 19, for the time of time-stamping of an image 30 by the processing unit 22 and for the time of transmission of a time stamped image, corresponding to the set 36, over the link 18.

In a particular embodiment, the processing unit 14 of the display system 12 further determines a control code corresponding to the clock value 31 and it transmits the set 35 comprising the clock value 31, and this associated control code 32 (labelled CTRL in FIG. 2), over the link 19 to the processing unit 22 of the image acquisition system 20. The processing unit 22 then performs the time stamping of an image 30 by associating with it the clock value 31 and the control code 32. The processing unit 22 transmits the set 36 comprising the image 30, clock value 31 and control code 32 over the link 18, to the processing unit 14 of the display system 12. The processing unit 14 receives the set 36 and determines a control code corresponding to the clock value 31 received. If this control code differs from the received control code 32, then the processing unit 14 determines an absence of integrity of the image 30 and it deactivates the display on the display unit 16 of at least the image 30 received from the image acquisition system 20. If the determined control code corresponds to the received control code 32, then the processing unit 14 checks the time stamp of the received image 30 in the same way as described previously.

In a second embodiment, the ancillary information corresponds to a predefined pattern. When the display system 12 receives an image 30 from the image acquisition system 20, the processing unit 14 searches for the predefined pattern in the received image 30 and determines a position of the predefined pattern in the received image. The processing unit 14 then determines a deviation between the position of the predefined pattern in the received image and a reference position. If this deviation is less than a predetermined value, the processing unit 14 determines an integrity of the received image. Otherwise, if this deviation is greater than or equal to the predetermined value, the processing unit 14 determines an absence of integrity of the received image. Thus, if the received image 30 is offset, for example downwards, then the predefined pattern is offset with the image, such that the position of the predefined pattern deviates from the reference position. The processing unit 14 can thus detect the offset of the image and deduce therefrom an absence of integrity of the image so as not to display the image on the display unit 16.

Figure 3:
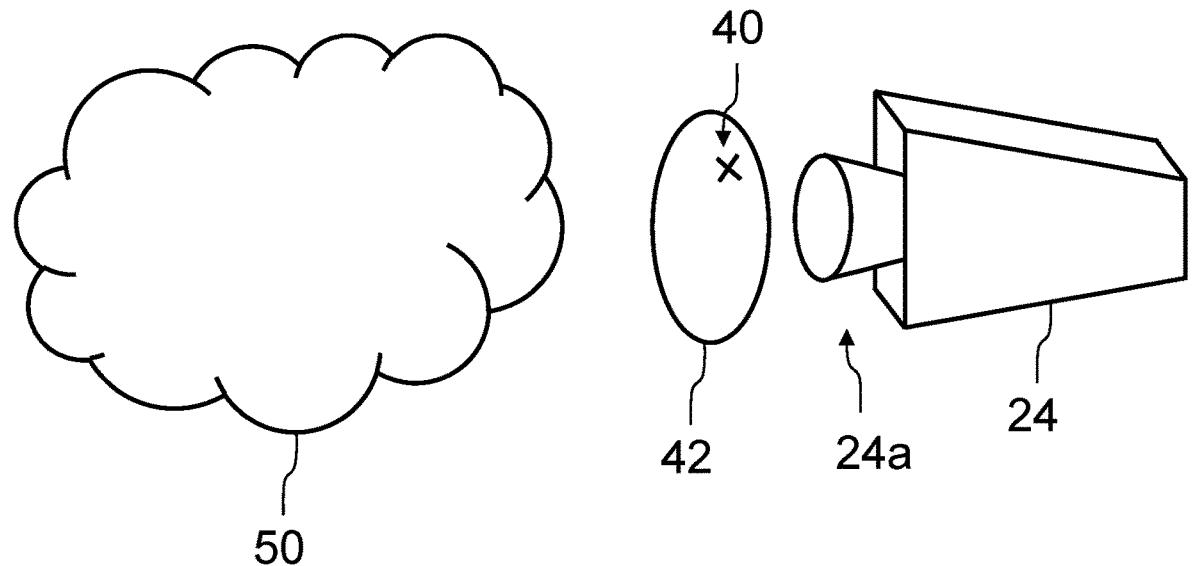
FIG. 3 illustrates a first variant of a second embodiment of the enhanced flight vison system of FIG. 1.

According to a first alternative illustrated in FIG. 3, the image acquisition system 20 comprises a mark 40 corresponding to the predefined pattern and interposed between the image sensor of the source of images 24 and the environment 50 of the aircraft 1. This mark 40 is, for example, produced on a transparent element 42, for example an optical lens or a protective glass situated between the image sensor of the source of images 24 and the environment 50 of the aircraft. In the case of an optical lens, that can form part of an optical camera lens 24a of the source of images 24.

Figure 4:
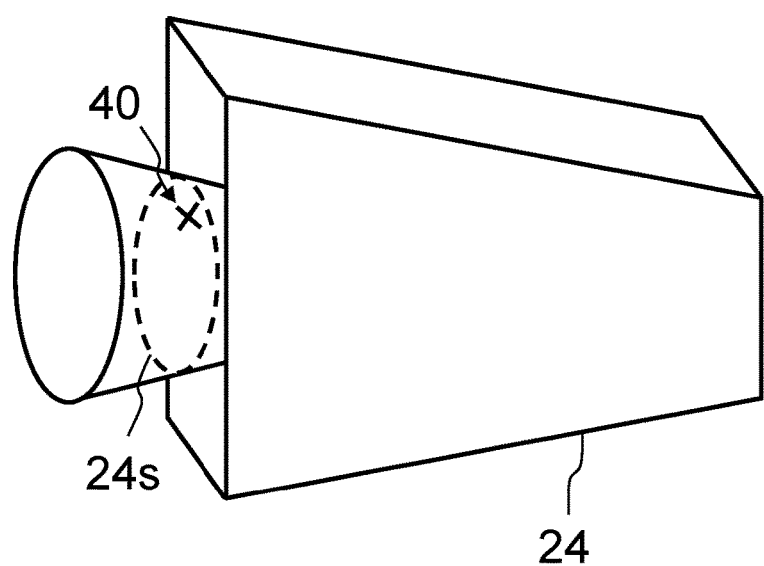
FIG. 4 illustrates a second variant of the second embodiment of the enhanced flight vision system of FIG. 1.

According to a second alternative illustrated in FIG. 4, the image sensor 24s of the image acquisition system 20 comprises a mark 40 corresponding to the predefined pattern. In one embodiment, the mark 40 is produced by marking (for example, using ink, paint, etc.) on sensitive elements corresponding to pixels of the image sensor 24s. In another embodiment, the mark 40 is produced by destruction (for example, by scraping) of sensitive elements corresponding to pixels of the image sensor 24s.

In the different embodiments, in cases of absence of integrity of a received image 30, in addition to the non-display of the image on the display unit 16, the display system 12 commands the display of a warning message on a display unit of the cockpit 3 of the aircraft, such as, for example, the display unit 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An enhanced flight vision system comprising:
   a display system for a cockpit of an aircraft configured to allow information to be displayed on a display unit in such a way that this information is visible to a pilot of the aircraft overlayed with an outside environment of the aircraft; and
   an image acquisition system, comprising at least one image sensor and provided to acquire images of the outside environment of the aircraft,
   wherein the display system is configured to receive images produced by the image acquisition system and to display these images on the display unit,
   wherein the image acquisition system is configured to associate ancillary information with at least a part of the images produced, and
   wherein the display system is configured to:
      check an integrity of an image received from the image acquisition system, based on ancillary information associated with that image, wherein the integrity of the image corresponds to the intrinsic quality of the image, and a non-integrity of the image corresponds to a failure of the image acquisition system, not to environmental conditions; and
      in an absence of the integrity, deactivate the display on the display unit of at least said image received from the image acquisition system.

2. The enhanced flight vision system according to claim 1, wherein the display unit is a head-up display or a display unit configured to be worn attached to a user's head.

3. The enhanced flight vision system according to claim 1, wherein the ancillary information corresponds to a time stamp of the image.

4. The enhanced flight vision system according to claim 3, wherein the display system is configured to transmit a clock to the image acquisition system and the image acquisition system is configured to time stamp the images based on said clock.

5. The enhanced flight vision system according to claim 4, wherein:
   the display system is configured to calculate a control code corresponding to the clock and to transmit the clock, with this associated control code, to the image acquisition system;
   the image acquisition system is configured to time stamp the images based on said clock and the associated control code; and
   the display system is configured to check whether the control code associated with an image received from the image acquisition system is correct and, if the control code associated with this image is not correct, to reject this image and determine an absence of integrity of the image.

6. An enhanced flight vision system comprising:
   a display system for a cockpit of an aircraft configured to allow information to be displayed on a display unit in such a way that this information is visible to a pilot of the aircraft overlayed with an outside environment of the aircraft; and
   an image acquisition system, comprising at least one image sensor and provided to acquire images of the outside environment of the aircraft,
   wherein the display system is configured to receive images produced by the image acquisition system and to display these images on the display unit,
   wherein the image acquisition system is configured to associate ancillary information with at least a part of the images produced, and
   wherein the display system is configured to:
      check an integrity of an image received from the image acquisition system, based on ancillary information associated with that image; and
      in an absence of the integrity, deactivate the display on the display unit of at least said image received from the image acquisition system,
   wherein the ancillary information corresponds to a time stamp of the image,
   wherein the display system is configured such that, when the display system receives an image from the image acquisition system, the display system calculates a difference between a current clock value and the clock value corresponding to the time stamp of the image and, the display system determines either an integrity of the image if this difference is less than a predetermined time, or an absence of the integrity of the image if this time difference is greater than or equal to said predetermined time.

7. An enhanced flight vision system comprising:
   a display system for a cockpit of an aircraft configured to allow information to be displayed on a display unit in such a way that this information is visible to a pilot of the aircraft overlayed with an outside environment of the aircraft; and
   an image acquisition system, comprising at least one image sensor and provided to acquire images of the outside environment of the aircraft, wherein the display system is configured to receive images produced by the image acquisition system and to display these images on the display unit, wherein the image acquisition system is configured to associate ancillary information with at least a part of the images produced, and wherein the display system is configured to:
  check an integrity of an image received from the image acquisition system, based on ancillary information associated with that image; and
  in an absence of the integrity, deactivate the display on the display unit of at least said image received from the image acquisition system, wherein the ancillary information corresponds to a predefined pattern and the display system is configured to:

when the display system receives an image from the image acquisition system, search for the predefined pattern in the received image and determine a position of the predefined pattern in the received image;

determine a deviation between the position of the predefined pattern in the received image and a reference position;

determine either an integrity of the received image if this deviation is less than a predetermined value, or an absence of integrity of the received image if this deviation is greater than or equal to said predetermined value.

8. The enhanced flight vision system according to claim 7, wherein the image acquisition system comprises a mark interposed between the image sensor and the environment, this mark corresponding to the predefined pattern.

9. The enhanced flight vision system according to claim 7, wherein the image sensor of the image acquisition system comprises a mark corresponding to the predefined pattern.

10. An aircraft comprising an enhanced flight vision system according to claim 1.

\* \* \* \* \*